(12) United States Patent
Mariani et al.

(10) Patent No.: US 11,105,696 B2
(45) Date of Patent: Aug. 31, 2021

(54) SYSTEM AND METHOD FOR MULTI-SENSOR COMBINATION FOR INDIRECT SPORT ASSESSMENT AND CLASSIFICATION

(71) Applicant: MindMaze Holding SA, Lausanne (CH)

(72) Inventors: Benoit Mariani, Lausanne (CH); Farzin Dadashi, Lausanne (CH)

(73) Assignee: MindMaze Holding SA, Lausanne (CH)

(*) Notice: Subject to any disclaimer, the term of this patent is extended or adjusted under 35 U.S.C. 154(b) by 205 days.

(21) Appl. No.: 16/411,156

(22) Filed: May 14, 2019

(65) Prior Publication Data

US 2020/0072690 A1    Mar. 5, 2020

Related U.S. Application Data

(60) Provisional application No. 62/671,204, filed on May 14, 2018.

(51) Int. Cl.
*G01L 5/00* (2006.01)
*A43B 3/00* (2006.01)

(52) U.S. Cl.
CPC .......... *G01L 5/0095* (2013.01); *A43B 3/0005* (2013.01)

(58) Field of Classification Search
None
See application file for complete search history.

(56) References Cited

U.S. PATENT DOCUMENTS

| | | | |
|---|---|---|---|
| 5,925,001 A * | 7/1999 | Hoyt | A61B 5/1036 600/595 |
| 6,052,654 A * | 4/2000 | Gaudet | A61B 5/1121 324/160 |
| 6,493,652 B1 * | 12/2002 | Ohlenbusch | A61B 5/1038 324/160 |
| 7,643,873 B2 * | 1/2010 | Chan | A61B 5/1118 600/520 |
| 10,034,622 B1 * | 7/2018 | Mahmoud | A61B 5/112 |
| 10,744,371 B2 * | 8/2020 | Mohrman | G01L 5/00 |
| 2008/0288200 A1 * | 11/2008 | Noble | A63B 24/0062 702/96 |
| 2011/0022349 A1 * | 1/2011 | Stirling | A61B 5/6807 702/141 |

(Continued)

*Primary Examiner* — John F Mortell
(74) *Attorney, Agent, or Firm* — Graeser Associates International Inc; Dvorah Graeser

(57) ABSTRACT

A system for measuring power output of a runner is disclosed. In some embodiments the system comprises a first sensor component including a first sensor, microprocessor, and a signal transceiver; a second sensor component including a second sensor and a signal transmitter; wherein the first sensor is configured to measure a vertical velocity and horizontal velocity, the second sensor is configured to measure the slope angle of a foot of the runner during a stance phase of the foot, the signal transmitter configured to send slope angle data, the signal transceiver configured to receive the slope angle data from the signal transmitter, and the microprocessor has computing instructions configured to calculate a power output based on the vertical velocity, horizontal velocity, and slope angle data.

20 Claims, 10 Drawing Sheets

(56) References Cited

U.S. PATENT DOCUMENTS

| | | | | |
|---|---|---|---|---|
| 2011/0231101 A1* | 9/2011 | Bidargaddi | ............ | A61B 5/1118 |
| | | | | 702/19 |
| 2011/0304497 A1* | 12/2011 | Molyneux | .......... | A63B 24/0021 |
| | | | | 342/42 |
| 2011/0313705 A1* | 12/2011 | Esser | ..................... | A61B 5/112 |
| | | | | 702/104 |
| 2013/0041617 A1* | 2/2013 | Pease | ................... | A43B 3/0031 |
| | | | | 702/139 |
| 2013/0178958 A1* | 7/2013 | Kulach | ................ | A61B 5/6807 |
| | | | | 700/91 |
| 2014/0277633 A1* | 9/2014 | Flaction | ................. | G16H 20/30 |
| | | | | 700/91 |
| 2018/0279916 A1* | 10/2018 | Folland | ................ | A61B 5/6804 |

* cited by examiner

SYSTEM AND METHOD FOR MULTI-SENSOR COMBINATION FOR INDIRECT SPORT ASSESSMENT AND CLASSIFICATION

FIELD OF THE DISCLOSURE

The present invention relates to systems and methods for measuring and communicating power and efficiency metrics during bipedal motion, including running, using sensor technology and feedback mechanisms.

BACKGROUND

With 65 million annual joggers and runners in the US (more than 20% of total population), running is the most practiced sport worldwide. Despite the recent adoption of GPS watches and heart-rate monitors, most runners do not get proper feedback to manage their runs, thus leading to drop-outs due to injuries, frustration, fatigue, or overreaching.

Power output measurement allows the monitoring of changes in performance and, thus, enhancement of performance. In cycling for example, power output (PO) has completely revolutionized training. With this new metric, the cyclist can train at the appropriate intensity zones and monitor performance changes and progress, taking into account the environment, slope, and speed. However, systems and methods that estimate PO for cycling can directly measure PO because of a bicycle's stable framework on which to mount sensors that directly measure force (e.g., crank arm, pedals) and angular velocity (e.g., spindle, freehub, sprocket). This type of direct measurement is not possible in activities involving other activities like running, walking, skiing and the like. These other activities lack a stable framework and involve irregular movements, independent movement of sections of the body and, to some extent, unpredictable movements.

Nevertheless, monitoring performance is important in running and other non-cycling endurance activities. It is known that in endurance activities, both for recreational or elite athlete, a large part of the training volume/duration should be in the moderate intensity domain (i.e., below the first lactic or ventilatory threshold). This "polarized training" (Muñoz et al., "Does polarized training improve performance in recreational runners?" *Int'l J. Sports Physiol. Perform.*, 2014) leads to larger aerobic capacity enhancement (Stöggl & Sperlich, "Polarized training has greater impact on key endurance variables than threshold, high intensity, or high volume training," *Front Physiol.*, 2014) and reduces the risks of overreaching or overtraining (Seiler, Haugen & Kuffel, "Autonomic recovery after exercise in trained athletes: intensity and duration effects," *Med. Sci. Sports Exerc.*, 2007) and subsequently of injuries (Kibler, Chandler & Stracener, "Musculoskeletal adaptations and injuries due to overtraining," *Exerc. Sport Sci. Rev.*, 1992) and illnesses (Gabriel et al., "Overtraining and immune system: a prospective longitudinal study in endurance athletes," *Med. Sci. Sports Exerc.*, 1998).

In running, the mechanical work notion dates back to the early work of Fenn ("Frictional and kinetic factors in the work of sprint running," *Am. J. Physiol.* 92, 1930) where the author attempted to explain the metabolic cost of running by quantifying the mechanical work. (Cavagna et al., "Mechanical Work in Running," *J. Appl. Physiol.*, 1964) later extended the calculation of Fenn (1930b) (Fenn, "Work against gravity and work due to velocity changes in running," *Am. J. Physiol.* 93, 1930) to a larger range of running speeds. In level running, different methods have been proposed to measure the total amount of work produced by the body and to derive the power. However, a clear and universally valid approach has not yet been established (Arampatzis et al., "Mechanical power in running: a comparison of different approaches," *J. Biomed.*, 2000).

Two distinct type of work have been identified: the external work which sustains the motion of the center of mass (CoM) of the body relative to the surrounding and the internal work which sustains the motion of the limbs relative to the CoM. The total work is defined as the absolute values of the external and internal work (Cavagna & Kaneko, "Mechanical work and efficiency in level walking and running," *J. Physiol.*, 1977).

The instrumentation used to estimate power is mainly based on force plate and camera-based motion tracking system to estimate ground reaction force and body kinematics and CoM speed. When compared at similar speeds, existing approaches resulted in different findings (Williams & Cavanagh, "A model for the calculation of mechanical power during distance running," *J. Biomech.*, 1983; Arampatzis et al., 2000).

Some studies also have investigated the relationship between power and metabolic energy (Williams & Cavanagh, "Relationship between distance running mechanics, running economy, and performance," *J. Appl. Physio.*, 1987; Shorten et al., "Mechanical Energy Changes and the Oxygen Cost of Running," *Engineering in Medicine*, 1981; Luhtanen et al., "Mechanical work and efficiency in treadmill running at aerobic and anaerobic thresholds," *Acta Physiologica Scandinavica*, 1990).

Fukunaga et al. ("Effect of running velocity on external mechanical power output," *Ergonomics*, 1980) showed that mechanical power increases as the running speed increases. Although the approaches to measure the mechanical work seemed to relate to the running speed and therefore, also on the net $VO_2$ changes, Cavagna et al. (1964) observed that produced efficiency ratio (mechanical power produced divided by the metabolic energy consumed) far exceeded the maximal efficiency of muscles. A spring-mass model (where the leg acts like a linear spring) was proposed to explain this difference (Cavagna et al., "The sources of external work in level walking and running," *J Physiol.* 1976; McMahon et al., "Groucho running," *J. Appl. Physio.*, 1987; Blickhan, "The spring-mass model for running and hopping," *J. Biomech.*, 1989). The stiffness of the spring was shown to be relatively constant over a wide range of speeds (He et al., "Mechanics of running under simulated low gravity," *J. Appl. Physiol.*, 1991; Farley et al., "Running springs: speed and animal size," *J. Exp. Biol.* 185, 1993) and provide a better modelling of speed and CoM vertical displacement which is of interest for power estimation. The measurement of leg and vertical stiffness was mainly done using force plate and/or video motion analysis (Brughelli & Cronin, "Preventing Hamstring Injuries in Sports," *Strength & Conditioning J.*, 2008). Considering that the equipment required for this type of analysis is costly and not practical for in-field measurements, Morin et al. ("A Simple Method for Measuring Stiffness during Running," *J. Appl. Biomech.*, 2005) proposed and validated a simple calculation method for assessing leg and vertical stiffness based on anatomical data and a few mechanical spatio-temporal parameters (e.g., contact and flight times, forward speed). This model was shown to be more robust when considering the different types of foot-strike patterns.

Udofa et al. ("A general relationship links gait mechanics and running ground reaction forces," *J. Exp. Biol.,* 2016) also evaluated the ability of an anatomically-based, two-mass model of the human body to predict vertical impact and peak forces during running from spatio-temporal parameters, concluding with the suitability of wearable sensor to predict vertical force.

Slope running is rarely studied. In one study, Dewolf et al. ("The rebound of the body during uphill and downhill running at different speeds," *J. Exp. Biol.,* 2016) proposed a modification of the spring-mass model, including an actuator in parallel with the spring that produces (uphill) or absorbs (downhill) energy according to the slope. The spring-mass model commonly used in running mechanics allows modelling the vertical and leg stiffness which are two important components in controlling running speed and ground reaction force and producing power. Stiffness was mainly investigated using 3D force plates.

The inventors have found that stiffness parameters are affected by fatigue through investigation using foot worn IMUs in real marathon race conditions. Significant differences ($p<0.05$) can be found on the vertical stiffness during the first half of the race as force decreases followed by stable values until the end of the race with no significant differences in leg stiffness can be found. The fast degradation of the vertical stiffness during the first half of the race can be explained by a decrease of peak vertical reaction force. It suggests that fatigue evolves quickly and attains a plateau at the middle of the marathon. The results allow a better understanding of fatigue mechanism during running as their fluctuation allowing to better guide the athlete to keep power efficient running.

Inertial Measurement Units (IMUs) consisting of 3D gyroscopes and 3D accelerometers, have been used in different analyses of running. In some studies, spatio-temporal parameters have been extracted from IMU signals obtained in different body locations. Some studies have used acceleration and/or angular velocity of the shank/tibia to detect temporal events and investigate peak tibial acceleration after impact (Crowell et al., "Reducing impact loading during running with the use of real-time visual feedback," *J. Orthop. Sports. Phys. Ther.,* 2010; Mercer et al., "Characteristics of shock attenuation during fatigued running," *J. Sports Sci.,* 2003). Other studies have used IMU on the trunk, the lower back, the head for spatio-temporal analysis of running, or a combination of those locations (Norris, Anderson & Kenny, "Method analysis of accelerometers and gyroscopes in running gait: A systematic review," *J. Sports Eng. & Tech.,* 2014; Bergamini et al., "Sprint running temporal parameters with IMU," 2012). Other studies have used foot-worn IMUs to estimate temporal parameters (Strohrmann et al., "Out of the lab and into the woods: kinematic analysis in running using wearable sensors," *UbiComp,* 2011; Chapman et al., "Identification of Cross-Country Skiing Movement Patterns Using Micro-Sensors," 2012; Brahms, "The assessment of fatigue-related changes in stride mechanics, variability and long-range correlations in recreational and elite distance runners using foot-mounted inertial sensors," 2017; Reenalda et al., "Continuous three dimensional analysis of running mechanics during a marathon by means of inertial magnetic measurement units to objectify changes in running mechanics," *J. Biomech.,* 2016) and estimate the running speed (de Ruiter et al., "Running Speed Can Be Predicted from Foot Contact Time during Outdoor over Ground Running," *PLoS One,* 2016).

Recently, Reenalda et al. (2016) have shown that IMUs can be used to perform a continuous 3D kinematic analysis of running technique during a marathon to objectify changes in running mechanics. Few studies have investigated the effect of feedback on the running technique. Messier et al. ("Effects of a verbal and visual feedback system on running technique, perceived exertion and running economy in female novice runners," *J. Sports Sci.,* 1989) showed the benefit of 5 weeks training with visual and verbal feedback on running technique. Later, Crowell et al. (2010) used real-time visual feedback to reduce impact load, measured using accelerometers fixed on tibias. Finally, Eriksson et al. ("Immediate effect of visual and auditory feedback to control the running mechanics of well-trained athletes," *J. Sports Sci.,* 2011) showed the usefulness of giving visual and auditory feedback to elite athletes to reduce step frequency and CoM vertical displacement.

Others in the field have not developed the high-performance biomechanics signal processing techniques required to extract running power from various inertial sensor locations. There are currently 3 types of existing systems that measure power output from biomechanical signals. However, none of them sufficiently measure power output or satisfy customer requirements. Current devices include GPS watches, heart-rate monitors, and consumer-grade power meter devices. GPS and heart-rate-based devices are technologically limited to assess power in real-time and thus not usable for proper running pace management as soon as there are slopes during a run. In particular, GPS devices are unable to assess power on slopes in real-time. Heart-rate-based devices are unable to assess power in real-time during slope transitions where previous conditions still affect the heart rate and the body has not adjusted to current conditions. Some conditions that affect heart rate include the altitude, weather, dehydration, and the like. Current consumer-grade power meter devices similarly cannot effectively measure power because of the latency between terrain changes (e.g., slope) and heart rate or other biometric data. When a runner moves from flat terrain to an uphill slope, the heart takes some time to adapt its frequency to the new condition. Thus, for current devices, power output measurements are accurate only to the extent they are used on terrain with few or only gradual slope changes.

Measuring power output during running or other like activity that involves some irregular movement (e.g., skiing) can be done only indirectly. That is, current devices can measure spatio-temporal parameters, force at specific places and times, acceleration of different portions of the body, and the like and then piece together an estimate of power from the measurements. As a result, current devices are inaccurate despite their complexity. Indeed, current systems incorporate overly complex designs to overcome inaccuracy. They include sensor systems that group sensors in a single housing to be mounted on the clothing or another device of a runner. These prior systems use combinations of IMUs, accelerometers, gyroscopes, and pressure and temperature sensors in concert within the device to derive power estimates. However, these systems suffer from the complexity required to reconcile all of the different sensor measurements from the device which may give different results across different sessions for various reasons, including inconsistent placement of the device on the user. Additionally, these devices suffer from inaccurate readings because of the limited types of measurements they can take. Indeed, runners' experience and providers of prior devices and methods suggests that the results are unreliable.

Current devices rely on sensor assemblies that transmit measurement data to some other device like a smartphone or fitness watch for processing. Sensor assemblies are separated from the processing and display device in part to save battery life of sensor assemblies and other devices. Separating devices is necessary to conserve battery power but contributes to the inaccuracy of results.

One such prior device, Stryd described in U.S. Publ. No. 20170189752A1, is a foot-worn device which claims to measure power and to synchronize with some of the latest generation of smartwatches. However, Stryd's accuracy and precision are questionable in spite of its complex grouping of sensors to gather a multitude of metrics. Further, it is doubtful that a single sensing position is sufficient to estimate accurate running power output. Additionally, the Stryd, along with other similar devices, despite their already high expense, require pairing with other expensive devices such as smartphones and smart watches to provide feedback from the user.

Power output estimation for skiing similarly has been attempted without much success or accuracy. For example, estimating methods have used analysis of film of skiers for rough comparisons (Norman & Komi, "Mechanical Energetics of World Class Cross-Country Skiing," *Intl J Sports Biomech Vol.* 3, 1987) and later estimations of just upper body power output.

Current devices and systems measure slope, which is used to estimate power, using barometric pressure changes or vertical velocity or acceleration of the runner. Such measurements can be inaccurate or lag such that on varied terrain, power estimates can be significantly unreliable.

Given the above shortcomings of the current art, a need still exists for a power meter device that can provide runners and other athletes the accuracy of power output measuring that cyclists enjoy. In particular, a need still exists to provide proper and accurate power estimations to runners to manage their runs and avoid drop-outs because of injuries, frustration, fatigue, or overreaching through advanced signal processing and machine learning methods to estimate the external mechanical power of the runners the kinematic signals from more effective use of sensors and sensor placement. Furthermore, a need exists for a device that effectively estimates PO regardless of terrain, whether even or uneven, road or trail, and the like to assist athletes improve daily practice and performance regardless of fitness and skill level, whether recreational or elite.

SUMMARY OF SOME OF THE EMBODIMENTS

Preferred embodiments assess spatio-temporal parameters (alternatively, spatio-temporal parameters may be referred to as temporal parameters herein) of the running gait (alternatively, spatio-temporal parameters may be referred to as temporal or spatio-temporal phases herein), using foot-worn inertial measurement units (IMUs). Preferred embodiments additionally include a plug-and-play method to remove the influence of the sensor's initial orientation on the system's accuracy and precision. Spatio-temporal parameters measured include ground contact time, flight phase duration, swing phase duration, and cadence. Methods for accurately estimating power output measure, at each step, both initial contact and terminal contact events. Spatial parameters related to the 3D orientation of the foot, namely foot pronation angle and foot strike angle are also measured in preferred embodiments. Preferred embodiments also apply machine learning techniques to estimate the essentially instantaneous running speed, in real-time, using some of the aforementioned temporal parameters as input of the model.

Preferred embodiments of the present invention include advanced signal processing and machine learning methods to estimate the external mechanical power provided by a runner and different sensors, including inertial measurement unit (IMU) sensors, and sensor placements. Unique combinations of kinematic signals from the sensors provide relevant and accurate power output monitoring.

Preferred embodiments include an apparatus for measuring power output of a runner having only one sensor position (either foot, wrist or head for instance) on a runner and measuring power output according to slope by detecting slope changes and retroactively applying slope measurement to spatio-temporal data. In preferred single-sensor position embodiments, no other devices are required for measuring power output.

Some preferred embodiments include a system for measuring power output of a runner having a plurality of IMU mounted on the body of the runner resulting in accurate power measurement estimates.

Some preferred embodiments include foot-worn IMUs and signal processing algorithms to assess spatio-temporal parameters of the running gait measured at the foot using the IMUs. Additionally, such embodiments incorporate an initialization method to remove the influence of the sensor's initial orientation on the system's accuracy and precision and estimate temporal parameters, such as: ground contact time, flight phase duration, swing phase duration, and cadence. An initialization method detects initial contact and terminal contact of the foot with the ground. Initialization measurements also can be taken of the 3D orientation of the foot, namely foot pronation angle and foot strike angle. Foot orientation measurements can also be taken periodically as power is estimated and not just initially. Finally, we used a machine learning approach to estimate the instantaneous running speed, using some of the aforementioned temporal parameters as input of the model.

Some preferred embodiments can measure leg stiffness parameters using foot worn IMUs for analyzing the effect of fatigue on the stiffness parameters. For example, GPS speed, contact time and flight time can be measured over the course of a session. Vertical and leg stiffness can be calculated using Morin's equations (Morin 2005). Leg stiffness fluctuations during a session can be measured and combined with power output estimations for more robust feedback to a runner to maintain power efficient running.

Some preferred embodiments combine a minimal number of sensors to measure velocity and incline to calculate a power output estimation. In particular, incline can be measured by detecting the angle of the foot or shoe during a stance phase (also referred to as contact phase) of the runner's gait.

Other preferred embodiments combine a plurality of sensors mounted on the body, clothing, or wearables of the runner to measure velocity, incline/decline, and force. Various signal processing algorithms, machine learning techniques, or some combination thereof can be applied to sensor measurements and other measurements (e.g., initialization measurements) to estimate power output and provide runner feedback for maintaining efficiency or attaining higher efficiency.

Various embodiments of the methods, systems and apparatuses of the present disclosure can be implemented by hardware, software or a combination thereof. For example, as hardware, selected steps of a methodology according to some embodiments can be implemented as a chip and/or a circuit. As software, selected steps of a methodology according to some embodiments of the disclosure can be implemented as a plurality of software instructions being executed by a computer (e.g., using a suitable operating system). Accordingly, in some embodiments, selected method steps, systems and/or apparatuses of the present disclosure can be performed by or implemented in a processor (e.g., executing an application and/or a plurality of instructions).

Unless otherwise defined, all technical and scientific terms used herein have the same meaning as commonly understood by one of ordinary skill in the art to which this disclosure belongs. The materials, methods, and examples provided herein are illustrative only and not intended to be limiting.

Various embodiments of the methods, systems and apparatuses of the present disclosure can be implemented by hardware and/or by software or a combination thereof. For example, as hardware, selected steps of methodology according to some embodiments can be implemented as a chip and/or a circuit. As software, selected steps of the methodology (e.g., according to some embodiments of the disclosure) can be implemented as a plurality of software instructions being executed by a computer (e.g., using any suitable operating system). Accordingly, in some embodiments, selected steps of methods, systems and/or apparatuses of the present disclosure can be performed by a processor (e.g., executing an application and/or a plurality of instructions).

Although embodiments of the present disclosure are described with regard to a "computer," "computing device," and/or with respect to a "computer network," it should be noted that optionally any device featuring a processor and the ability to execute one or more instructions is within the scope of the disclosure, such as may be referred to herein as simply a computer or a computational device and which includes (but not limited to) any type of personal computer (PC), a server, a cellular telephone, an IP telephone, a smartphone or other type of mobile computational device, a PDA (personal digital assistant), a thin client, a smartwatch, head mounted display or other wearable that is able to communicate wired or wirelessly with a local or remote device. To this end, any two or more of such devices in communication with each other may comprise a "computer network."

BRIEF DESCRIPTION OF THE DRAWINGS

Embodiments of the disclosure are herein described, by way of example only, with reference to the accompanying drawings. With specific reference now to the drawings in detail, it is stressed that particulars shown are by way of example and for purposes of illustrative discussion of the various embodiments of the present disclosure only and are presented in order to provide what is believed to be a useful and readily understood description of the principles and conceptual aspects of the various embodiments of inventions disclosed therein.

DETAILED DESCRIPTION OF SOME OF THE EMBODIMENTS

Preferred embodiments include a research-grade power meter software library customized for running, to be embedded in wearable devices of various kinds (earphones, smartwatches, smartshoes, smartphones, etc.). Its innovation comes from its scientific approach and validity, and the use of multiple sensors at different body locations to derive the most accurate power estimation of running. Preferred embodiments can also include be used with existing sensor systems or assemblies or more simplified sensor systems or assemblies.

Preferred embodiments can estimate running power in every condition, such as indoor and outdoor running, on road, hill, trails, etc. using a complete data collection protocol covering the various situations and providing sufficient data as input to power output estimation models. Some preferred embodiments use quality reference systems and meta-data about the user such as age and gender to properly estimate physiological responses.

Additionally, preferred embodiments include real-time on-board processing to provide useful feedback during running and create value propositions for consumer wearables. Sensor systems in accordance with preferred embodiments can estimate power output in real-time with a minimal latency. In addition, preferred embodiments include on-board, real-time feature processing at the sensor level and minimal buffers and processing to limit battery leakage.

Preferred embodiments model and validate the instantaneous power measured using inertial sensors. The signal processing in preferred embodiments is performed in real-time and the ground reaction forces acting on the runner's body is modelled using the acceleration and angular velocity obtained from body-worn sensors. Moreover, spatio-temporal parameters are used for real-time estimation of mechanical power, but also to give direct feedback with parameters that could be modified by the athlete (e.g., changing cadence, stride length, etc.).

Figure 1:
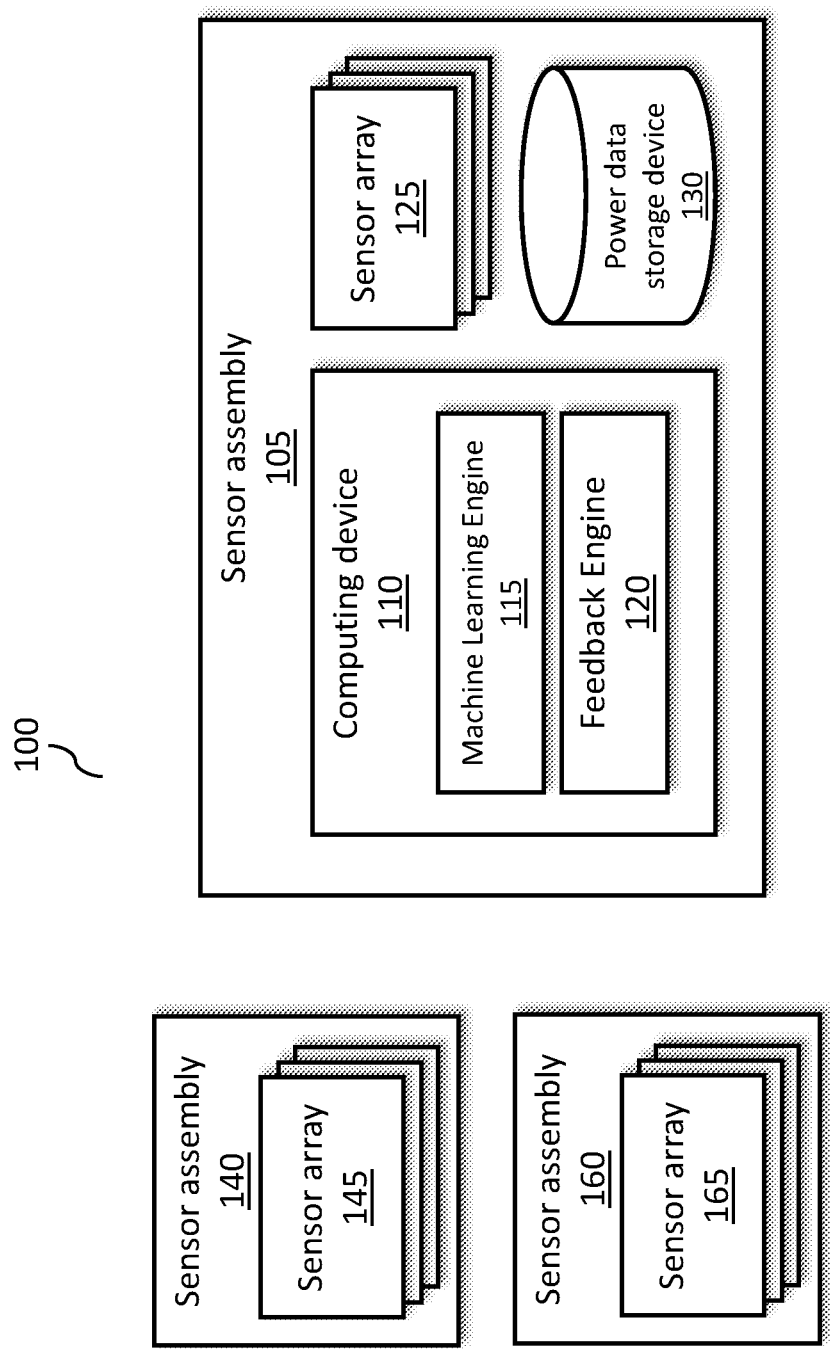
FIG. 1 illustrates a schematic of a sensor system according to preferred embodiments.

Referring now to the figures, FIG. 1 illustrates a schematic of a non-limiting, exemplary system 100 of sensor assemblies 105, 140, 160 for measuring the power output of a runner. The sensor system can include a main sensor assembly 105 that includes a computing device 110, a sensor array 125, and a power data storage device 130. In other embodiments a computing device can be remote and not located in a sensor assembly device. Sensor assembly 105 preferably has a small form factor and is configured as part of a wearable or to attach to a wearable. Sensor array 125 can include one or more sensors that measure velocity, acceleration, and the like. In a preferred embodiment, sensor array 125 includes one IMU sensor for measuring the vertical velocity and one IMU for measuring horizontal velocity. Other sensors that measure velocity can be used and sensors that measure other aspects of movement can be included in sensor array. For example, sensor array 125 can include a gyroscope or other type of accelerometer.

Computing device 110 includes machine learning engine and feedback engine. Machine learning engine can include an embedded machine learning library. The machine learning library can be implemented according to different AI techniques known in the art. For example, some non-limiting suitable techniques include LSTM networks; various types of RNN (recurrent neural network) such as a Siamese RNN; a CNN (convoluted neural network); and an MNN (modular neural network).

Feedback engine 120 can include machine instructions for creating feedback messages to the runner based on the computed power output from machine learning engine or changes in the rate of power output as determined in the machine learning engine.

Power data storage device 130 can store raw velocity, slope, and other measurements from sensor arrays as well as power computations from machine learning engine 115. Computing device 110 can be implemented using standard micro-controller processors such as the family of ARM M4 Cortex architectures.

Sensor assemblies 140, 160 include sensor arrays 145, 165. Sensor 145, 165 arrays can each be adapted to placement on different body parts of the runner. For example, a sensor array can include only IMUs to measure velocity, can include only a force sensor, accelerometer, or barometric pressure sensor to measure gait phase from a location on or near the runner's foot. Each of sensor assemblies include a wireless transceiver to send measurement data signals to sensor assembly. Sensor assembly includes a wireless transceiver to receive the measurement data signals from sensor assemblies for processing by machine learning engine 115.

Other preferred embodiments include machine instructions without a machine learning engine 115 for computing power output directly from measurements data signals received from sensor arrays.

Figure 2:
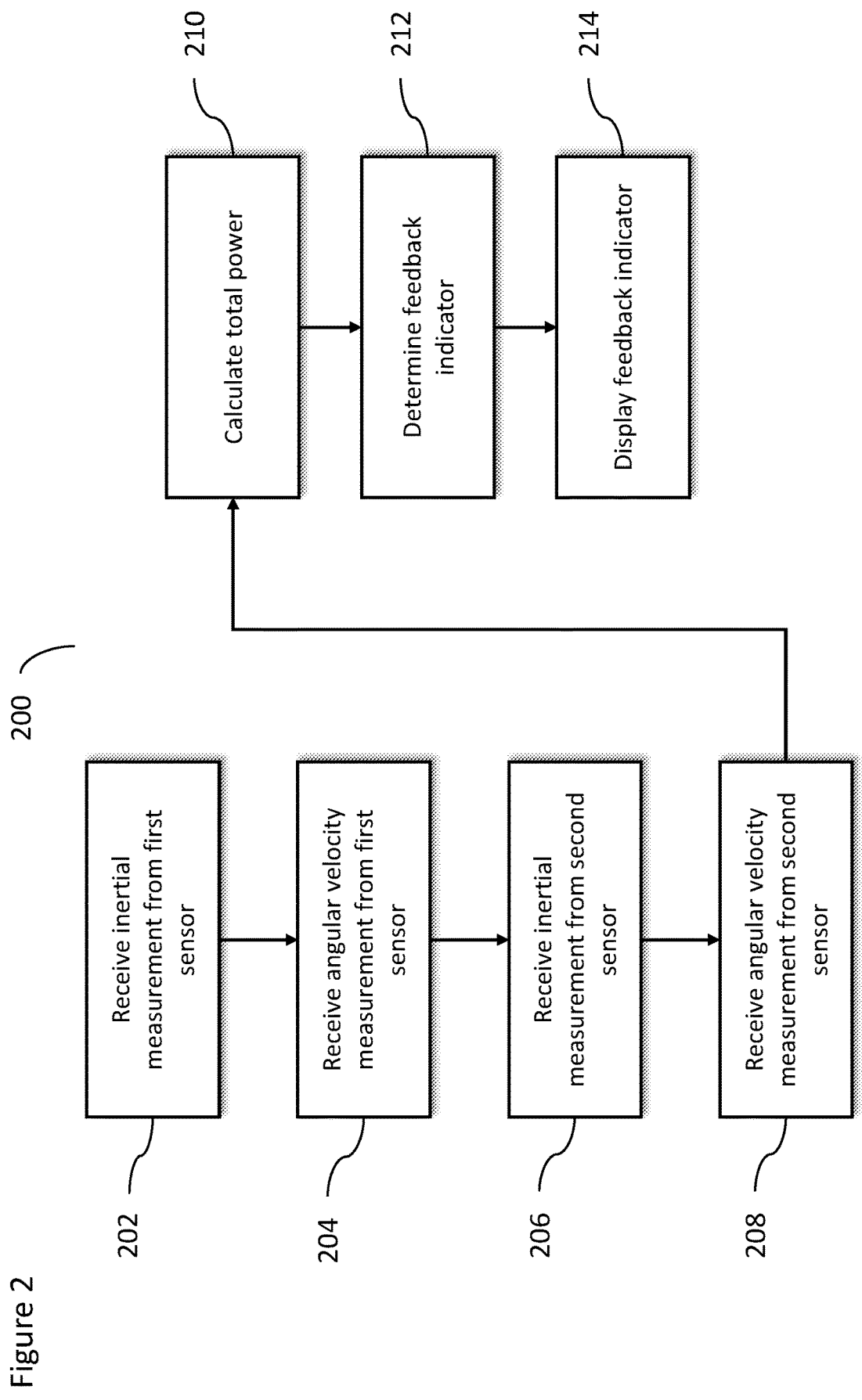
FIG. 2 illustrates a non-limiting, exemplary method for measuring and displaying power output metrics and feedback in accordance with preferred embodiments.

FIG. 2 illustrates a preferred method 200 for measuring and displaying power output metrics and feedback in accordance with embodiments. At step 202, an inertial measurement is received from a first sensor. At step 204, an angular velocity is received from the first sensor. At step 206, an inertial measurement is received from a second sensor. At step 208, an angular velocity is received from the second sensor. At step 210, a total power is calculated. At step 212, a feedback indicator is determined. A feedback indicator can comprise a number representing the total power, some graphical element (e.g., graph, geometric representation, color coding, and the like) that indicates the total power, audio feedback, or some combination thereof. In some instances, feedback can be relative based on the user's history or relative to a database of total power for multiple users or (how are they determined) (what determines them) (when are they determined/do they ever change) At step 214, the feedback indicator is displayed. (How) (where) (anything else displayed as a result) (how many) (any special characteristics?)

Figure 3A:
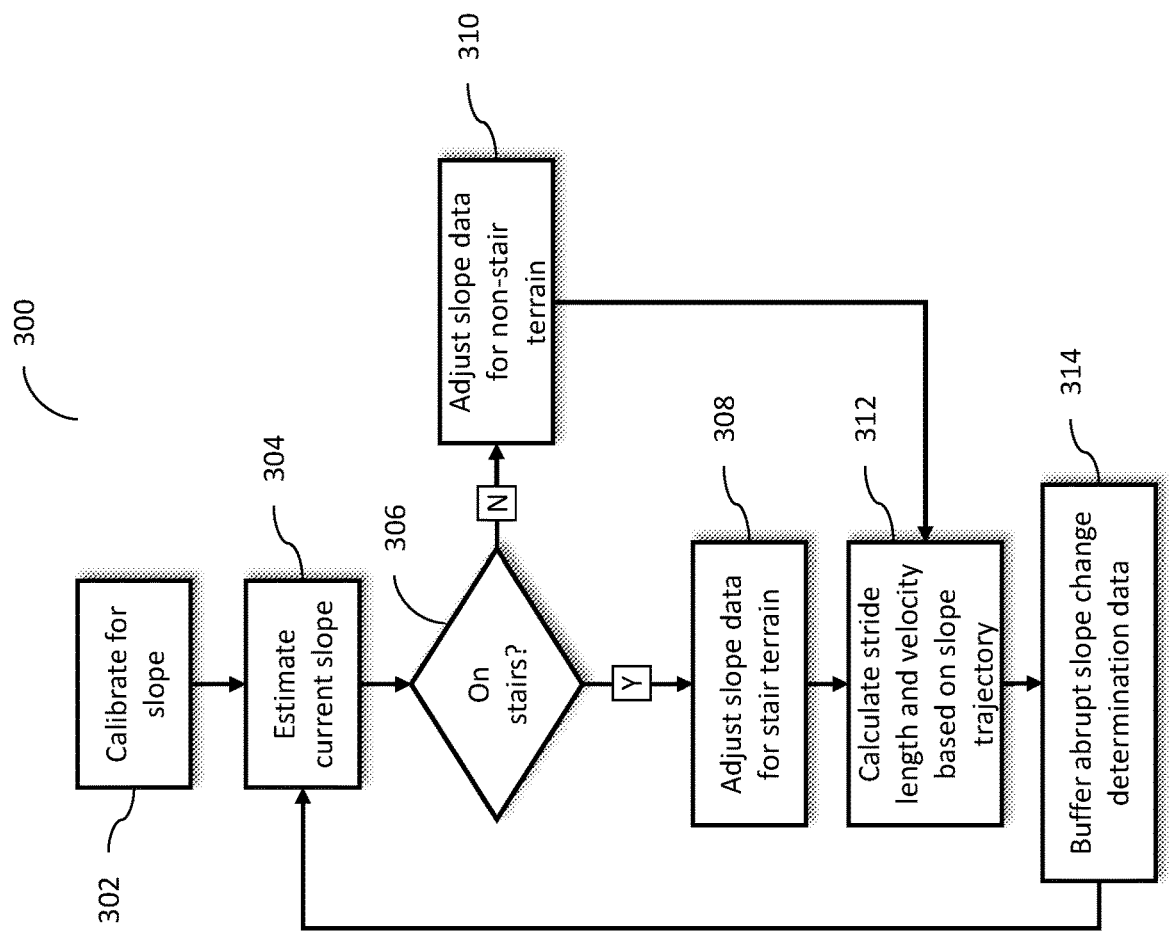
FIG. 3A illustrates a flowchart of a non-limiting, exemplary method for estimating power output for running in accordance with preferred embodiments.

FIG. 3A illustrates a preferred method 300 for estimating slope and slope changes. At step 302, sensors are calibrated for slope. Sensor calibration is discussed further in connection with FIG. 3B. The user may or may not be on a flat surface but during calibration the slope of that surface will serve as the baseline slope for the calibration process. The calibration process is preferably performed a plurality of times to more accurately determine a baseline slope. At step 304, the current slope is estimated. In preferred embodiments, barometric pressure and foot orientation are measured to determine slope. Estimation of slope is discussed further in connection FIG. 3C. At step 306, a check is made whether the user is on stairs. In some preferred embodiments, this is done by comparing the slope estimation and the orientation of the foot. For example, if the slope estimation is within a stair slope range and the foot orientation is within a range that would indicate a flat surface, then a determination is made that the terrain is stairs. Preferably, the stair slope range is between ±20 and 60 degrees and more preferably between ±30 and 50 degrees. To increase the accuracy of the determination, some preferred embodiments will buffer the sensor data used to determine slope and the determination of stair terrain will be based on an essentially constant or smoothly changing slope estimation. That is, where the sensor data indicates an essentially constant change in elevation over the course of several gait cycles a determination can be made that the terrain is stairs but if the slope estimation varies beyond a threshold over the course of several gait cycles, a determination is not made that the terrain is stairs. The number of gait cycles buffered is more than one but, in some preferred embodiments can be adjusted. Preferably, the variance threshold is 3 degrees and, more preferably, can be adjusted. The slope estimation itself is determined as discussed further herein. Preferably, the flat surface range for stairs is between 0 and −12 degrees. In some preferable embodiments, the flat surface range for stairs can be adjusted for the user based on the user's kinematics. This determination can be important as the slope of the foot during a stance phase will indicate the that user is on a flat surface but is actually on a sloped plane.

If the user is on stairs, then at step 308, the slope data is adjusted for stair terrain. Additionally, in some embodiments, heel strike, heel off, and toe strike data are removed from the sensor data. Heal strike, heal off, and toe strike data are not as relevant when the user is on stairs because of how gait is adjusted to accommodate the flat surface of a stair. If those temporal phases are included, then gait analysis and timing could be inaccurate because those phases do not exist on stair terrain in the same way as for non-stair terrain. If the user is not on stairs, then at step 310, the slope data is adjusted for non-stair terrain. At step 312, the stride length and velocity are calculated based on the slope trajectory or slope estimation for later input into a power output estimation. Inertial data typically indicates gait phases inaccurately. Consequently, in some preferred embodiments, gait phase data (e.g., stride length) and velocity data are adjusted by calculating the interrupt of inertial data through the slope trajectory. At step 314, abrupt slope change determination data is buffered. Slope change data can be derived from pressure sensor data changes (e.g., barometric pressure), topographical data, infrared time-of-flight sensor data, and the like, as well as foot orientation. The data can indicate a slope change when there is only a temporary change in the terrain and not necessarily from an actual slope change. For example, a user can be running over a protruding rock, log, or bump which causes the foot to be inclined at a greater angle than the overall current terrain would suggest. Additionally, because the runner can be elevated according to the terrain protrusion, barometric data can also suggest a rising slope. However, over just a few cycles the data will revert back to indicating a lack of change in the overall slope or only slight changes in the slope. Therefore, in preferred embodiments, abrupt slope changes are buffered for a number of cycles for comparison with slope data from later cycles. An abrupt slope change can be a change in slope that results in a change to the power output but a change in heart rate or other biosignals lags. In some embodiments, a parameter indicating whether a particular slope change is abrupt can be user-defined. If slope data from later cycles confirms the new slope, then an abrupt change can be determined and be used as an input to the power output estimation. Buffered abrupt slope change determination data is maintained preferably for 3-5 cycles. It should be understood that the embodiments other than a whole-body kinetics embodiment can use methods similar to the method exemplified in FIG. 3A.

Buffering abrupt slope change data is important to achieve superior power estimation results. As discussed herein, biometric data that would indicate slope change and, thus, increased power output, typically lags actual slope change. Additionally, sensor data typically used to determine slope changes (e.g., barometer, topographic information, etc.) may present inaccuracy or similarly lag. To increase accuracy in determining slope changes and particularly, abrupt slope changes, foot orientation is included in the determination. Foot orientation angles change immediately upon a slope change. However, foot orientation can present a false positive when the user's foot is on a temporary protrusion or a false negative when the user is on stairs. To account for the false positives and negatives, preferred embodiments will sample both traditional types of sensor data and foot orientation and buffer them both over a number of cycles as discussed herein so that proper and more accurate power output estimates can be calculated in the event the user remains on a similar slope and encountered a protrusion (e.g., pressure change rate is steady but foot orientation indicates abrupt change—false positive), is on stairs (e.g., pressure change rate increases but foot orientation indicates essentially flat terrain—false negative), or has encountered an abrupt slope change (e.g., both pressure change rate increases and foot orientation indicates abrupt change).

Figure 8:
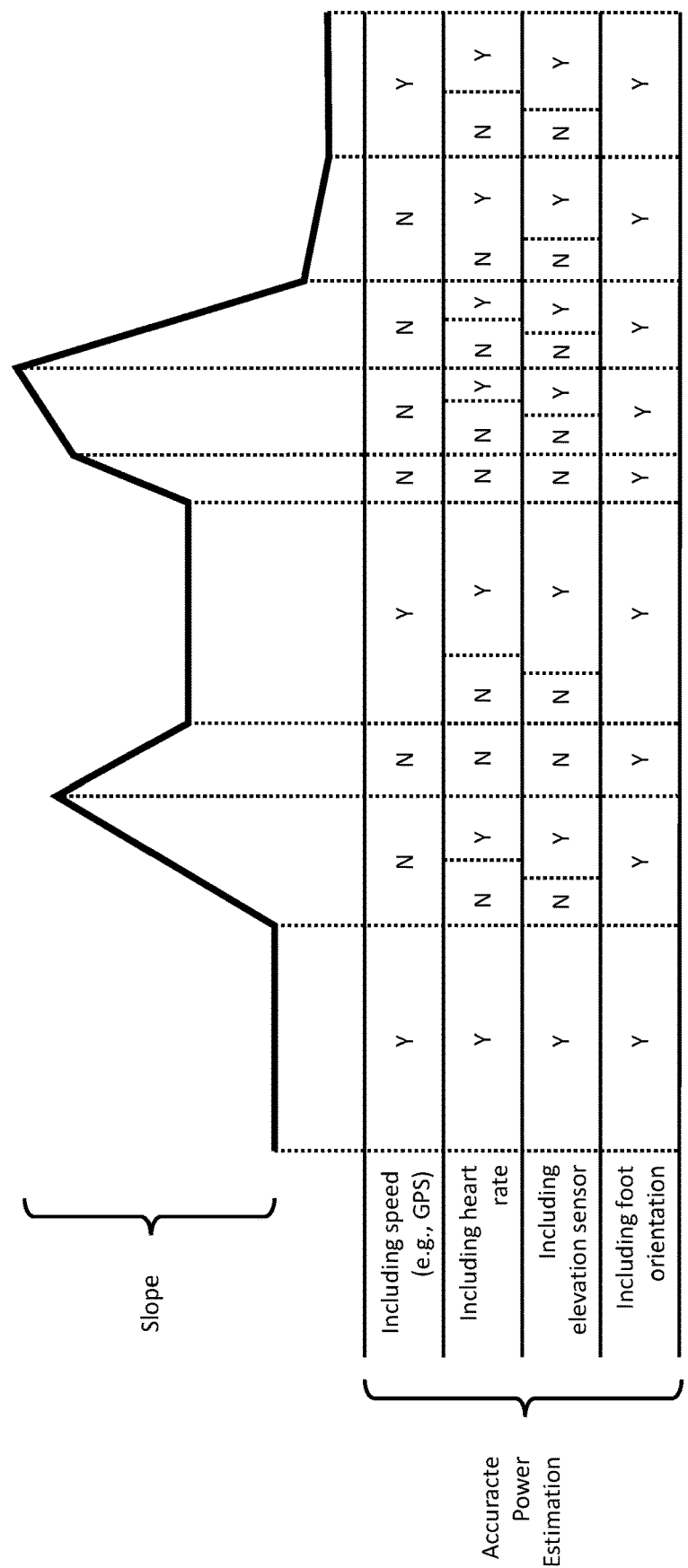
FIG. 8 illustrates a chart of slope changes and accuracy of power estimation among different classes of power estimation devices including preferred embodiments that include foot orientation measurements.

Thus, preferred embodiments estimate power while accounting for abrupt slope changes without the lag inherent in previous power estimation devices and systems. This is important for assisting users to maintain a proper pace during the slope changes to maximize power efficiency, as illustrated in FIG. 8. In current devices, the best results are derived when changes in elevation are detected, but during and shortly after abrupt changes, event the most accurate current devices lag in their ability to estimate power (see the second and third row of FIG. 8).

Figure 3B:
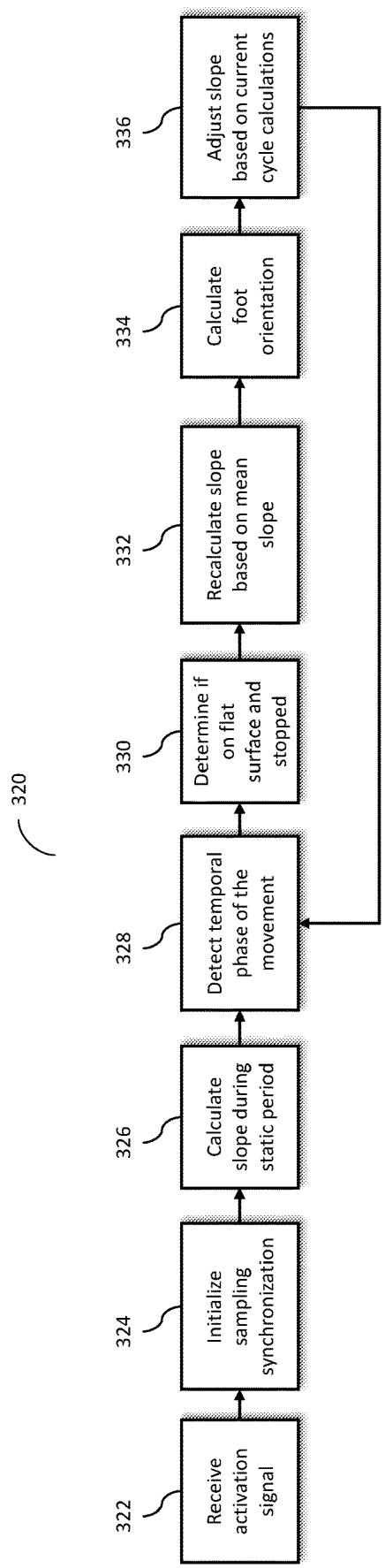
FIG. 3B illustrates a flowchart of a non-limiting, exemplary method for calibrating a sensor or sensor assembly to measure power output for running in accordance with preferred embodiments.

FIG. 3B illustrates a preferred method 320 for calibrating sensors for slope calculation. At step 322, an activation signal is received by the sensor assembly. Each sensor assembly worn by the user receives the activation signal. At step 324, sampling synchronization is initialized. Different types of sensors will sample data at different frequencies. For example, a barometer is typically sampled four times for every accelerometer sampling. Therefore, in preferred embodiments, the sample rates are synchronized so that data is collected from the sensors at essentially the same time. At step 326, the slope during a static period is calculated. A static period is one in which the user is stationary or near stationary. Here, slope can be calculated using foot orientation. A baseline barometric pressure can also be taken for comparison with later changes in pressure to help determine slope. At step 328, a temporal phase of the movement is detected. In a preferred embodiment, precision is not required at this step. That is, some preferred embodiments require only a rough segmentation of the temporal phases (e.g., is the user in a contact phase or not). At step 330, it is determined whether the user is on a flat surface and stopped. At step 332 the slope is recalculated from new slope data obtained and a mean of the slope data from the previous cycles. At step 334, the foot orientation is calculated. At step 336, the slope based on the current cycle calculations is adjusted. If a baseline slope is determined so that an offset angle of the current slope from the 0° plane is known within a margin of error, then the calibration cycle is not repeated. In preferred embodiments, steps 328-334 of the calibration cycle are repeated at least a predetermined number of times and until a sufficiently accurate baseline slope is determined. It should be understood that the embodiments other than a whole-body kinetics embodiment can use methods similar to the method exemplified in FIG. 3B.

Figure 3C:
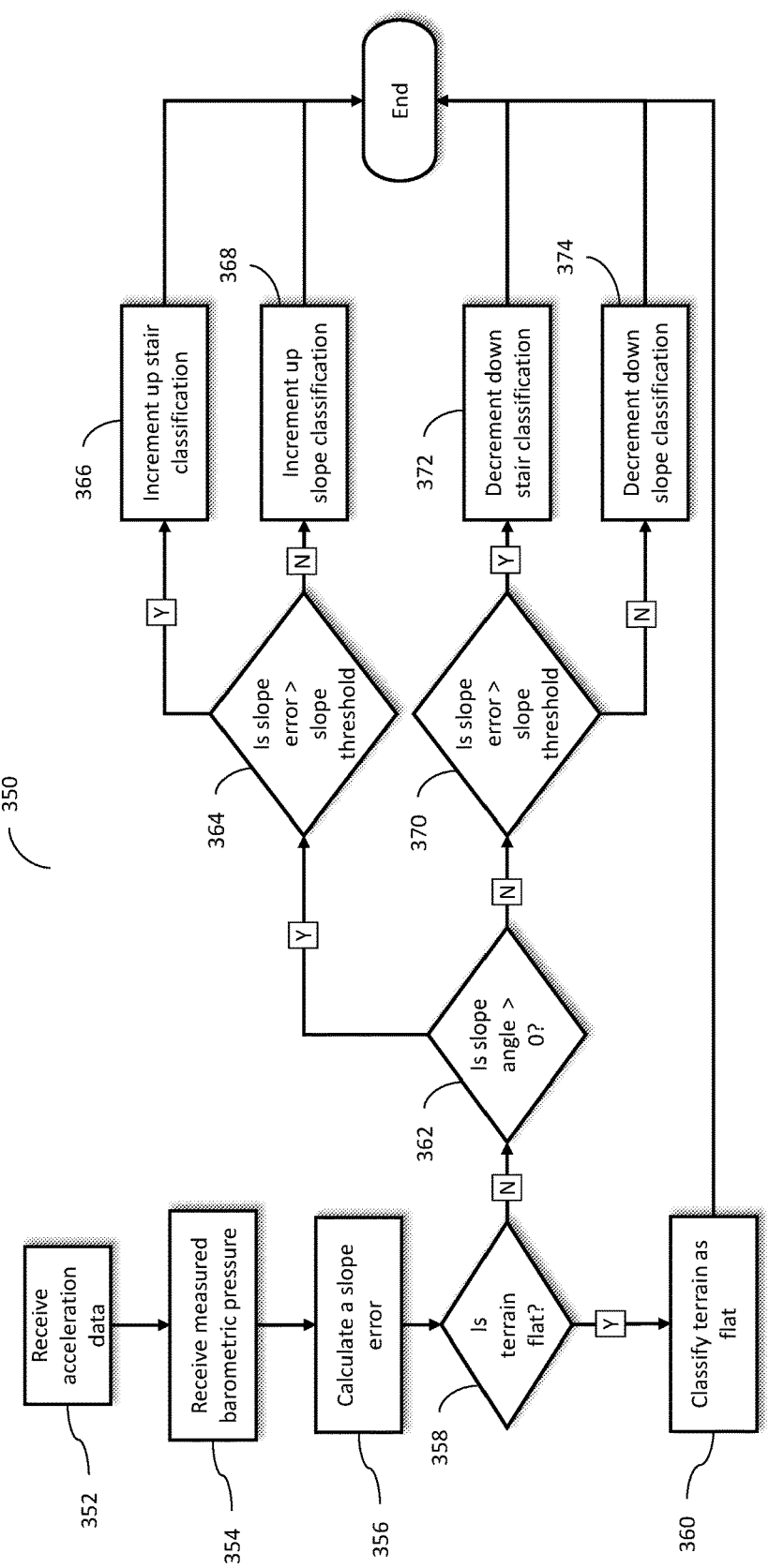
FIG. 3C illustrates a flowchart of a non-limiting, exemplary method for detecting and determining slop for power output measurement for running in accordance with preferred embodiments.

FIG. 3C illustrates an exemplary method 350 for measuring slope changes for input into a power output estimation calculation in accordance with preferred embodiments. At step 352, acceleration data is received from one or more sensors. In preferred embodiments, acceleration data includes both horizontal and vertical acceleration data and includes acceleration from gravity. Velocity data is also collected. Acceleration and velocity data are important to collect because at higher speeds, barometric pressure measurements will less reliable. At step 354, barometric pressure measured by one or more barometers is received. At step 356, a slope error is calculated from the barometric pressure change from the previous cycle. At step 358, it is determined whether the current terrain is flat based on foot angle during a stance phase and a change in the barometric pressure. In some preferred embodiments, foot inclination (also referred to as foot orientation) can be determined from acceleration data from an accelerometer mounted at the foot. In some instances, the accelerometer can be integrated as part of a shoe or other footwear, clothing or gear at the foot in a location of the foot that experiences an inclination when the foot is in a contact phase on sloped terrain. Thus, when the foot is inclined or declined during a portion of the contact phase, the accelerometer will generate data showing, for example, a lesser vertical acceleration relative to the accelerometer and a greater horizontal acceleration relative of the accelerometer. If the terrain is considered flat, then at step 360 the current terrain is classified as flat and no change to slope metrics is made. If the terrain is not considered flat, then at step 362, it is determined whether the slope angle of the current terrain is greater than 0°. If it is, then at step 364, it is determined whether the change in slope is greater than a slope change threshold. A slope change threshold is preferably 2 degrees. More preferably, a slope change threshold can be at a user-defined predetermined level in some embodiments. In other embodiments, slope change thresholds can be based on the measurements taken from slope measurements and compared against biosignal(s) where the slope measurements indicate a change but the biosignal(s) do not. If the slope change is beyond the slope change threshold, then at step 366, the terrain is classified as "up stair" and a slope counter is incremented. In a preferred embodiment, the slope counter is incremented by a predetermined amount. If the slope change is not beyond the slope change threshold, then at step 368, the terrain is classified as "up slope" and incremented. In a preferred embodiment, the slope counter is incremented by a predetermined amount.

If the slope angle is not greater than 0°, then at step 370 it is determined whether the change in slope is greater than the slope change threshold. In preferred embodiments, the slope change threshold used in step 370 is the same as the slope change threshold used in step 364. If the slope change is beyond the slope change threshold, then at step 372, the terrain is classified as "down stair" and the slope counter is decremented. In a preferred embodiment, the slope counter is decremented by a predetermined amount. If the slope change is not beyond the slope change threshold, then at step 374, the terrain is classified as "down slope" and decremented. In a preferred embodiment, the slope counter is decremented by a predetermined amount. It should be understood that the embodiments other than a whole-body kinetics embodiment can use methods similar to the method exemplified in FIG. 3C.

Different methods have been proposed for calculation of mechanical power during running. Power estimation is based on the estimation of the product of force-velocity or moment-angular velocity. The common reference method to estimate power is based on force plate. The ground reaction force during stance phase $F_{GRF}$ is used as the force acting on CoM and the power ($P_{GRF}$) is estimated from the integration of CoM acceleration obtained through $F_{GRF}$ as follow:

$$P_{GRF} = F_{GRF} \times \left( v_0 + \int \frac{F_{GRF}}{M \times dt} \right) \qquad \text{Eq. (1)}$$

With $v_0$ an integration constant corresponding to the mean velocity of the runner of mass M. Skilled artisans can appreciate that as compared to other methods, e.g., using multi-segment kinematics, a whole-body kinetics method shows good behavior and correspondence with oxygen uptake.

Whole-Body Kinetic Embodiment

Figure 4:
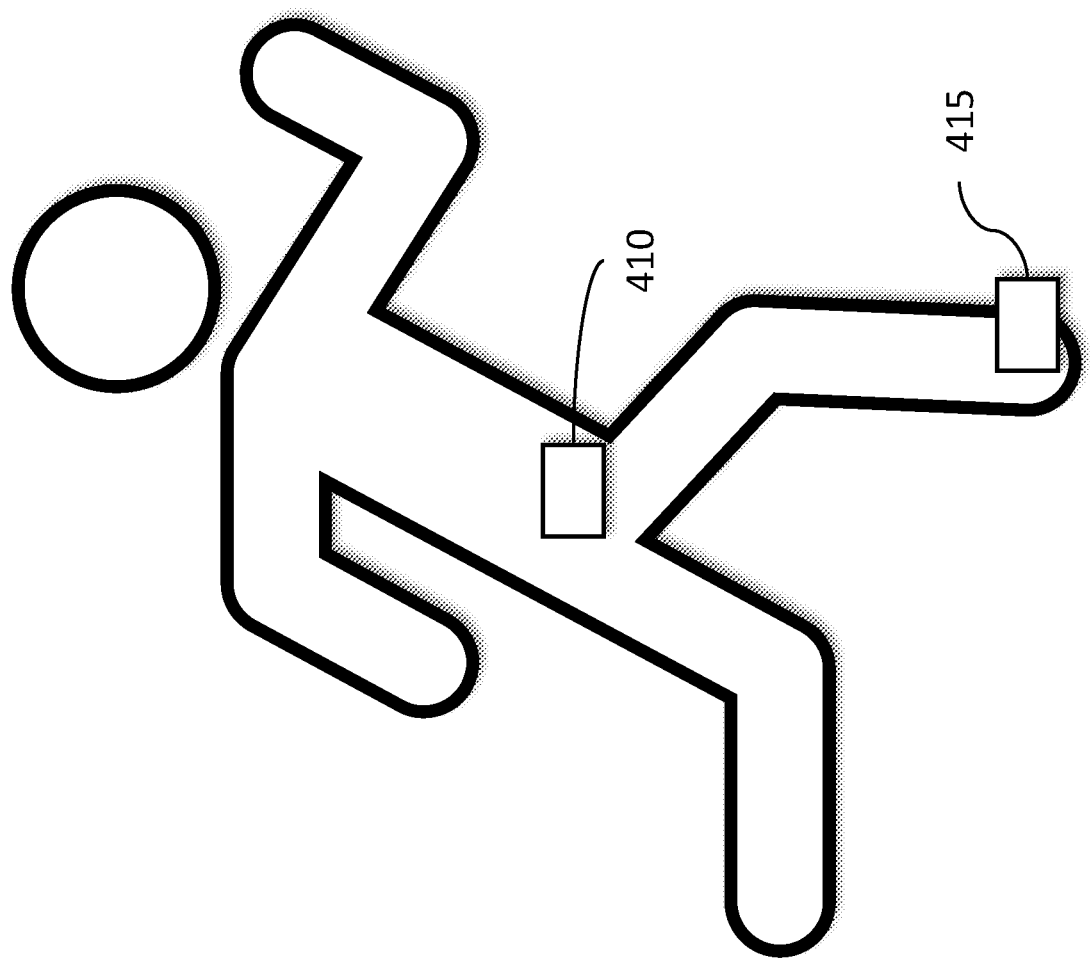
FIG. 4 illustrates a schematic of a non-limiting, exemplary configuration of sensors on the body of a runner in accordance with preferred embodiments.

FIG. 4 illustrates an arrangement of sensor assemblies, sensors, or a combination thereof on a runner for the measurement of total power. In the arrangement shown, sensors or sensor assemblies 410, 415 are placed at the waist near the center of mass of the user and at the foot. Spatiotemporal measurements are taken at each location. One or more of the sensors 410, 415 can be mounted to a runner's body as part of an assembly of components, in a packaging or case, as part of the runner's clothing, to another item mounted to the runner's body, or some combination thereof. Preferably, such a sensor assembly is located on the torso of the runner and most preferably at or within a few inches of the waist. Different runners can have a different center of mass and the sensor assembly should be place near that vertical center of mass. One or more sensors of the sensor assembly located near the center of mass measure acceleration and velocity in at least 4 directions (2 vertical dimension directions and 2 horizontal dimension directions). In some preferred embodiments, one or more sensors also measure acceleration and velocity in 2 other horizontal directions orthogonal to the other horizontal directions. Sensors here can also include a barometer or barometric pressure sensor.

At least one sensor assembly (for example, sensor 415) is located on the body so that the ground inclination during a run can be measured. Preferably, such a sensor assembly is located on the shoe or at the foot and includes an IMU, accelerometer, barometric pressure sensor, some other sensor, or a combination thereof configured to measure the inclination of the slope during the stance phase of the runner's gait as described herein. One or more of the sensors can be used to measure foot orientation for estimating slope. It is important, particularly for more advanced users, that the weight and size of a sensor assembly at the foot be as small and light as possible. Thus, in preferred embodiments, the architecture of a sensor assembly mounted at the foot is simplified and efficient by using a smaller microprocessor and memory, only essential sensors, and less PCB material. For example, in one preferred embodiment, a sensor assembly can include a single IMU, a microcontroller, and a wireless communications device to send data to another assembly or device. To further reduce mass of the sensor assembly, the components or packaging of components can be integrated or be made as part of footwear or clothing at the foot or area of the foot. Placing a sensor at the foot as opposed to elsewhere on the body can allow for drift correction and for measuring the foot-ground interface (e.g., ground slope and other interface characteristics). Sensor arrangements similar to the arrangement of FIG. 4 can be used with methods similar to the exemplary method discussed in connection with FIG. 5.

Figure 5:
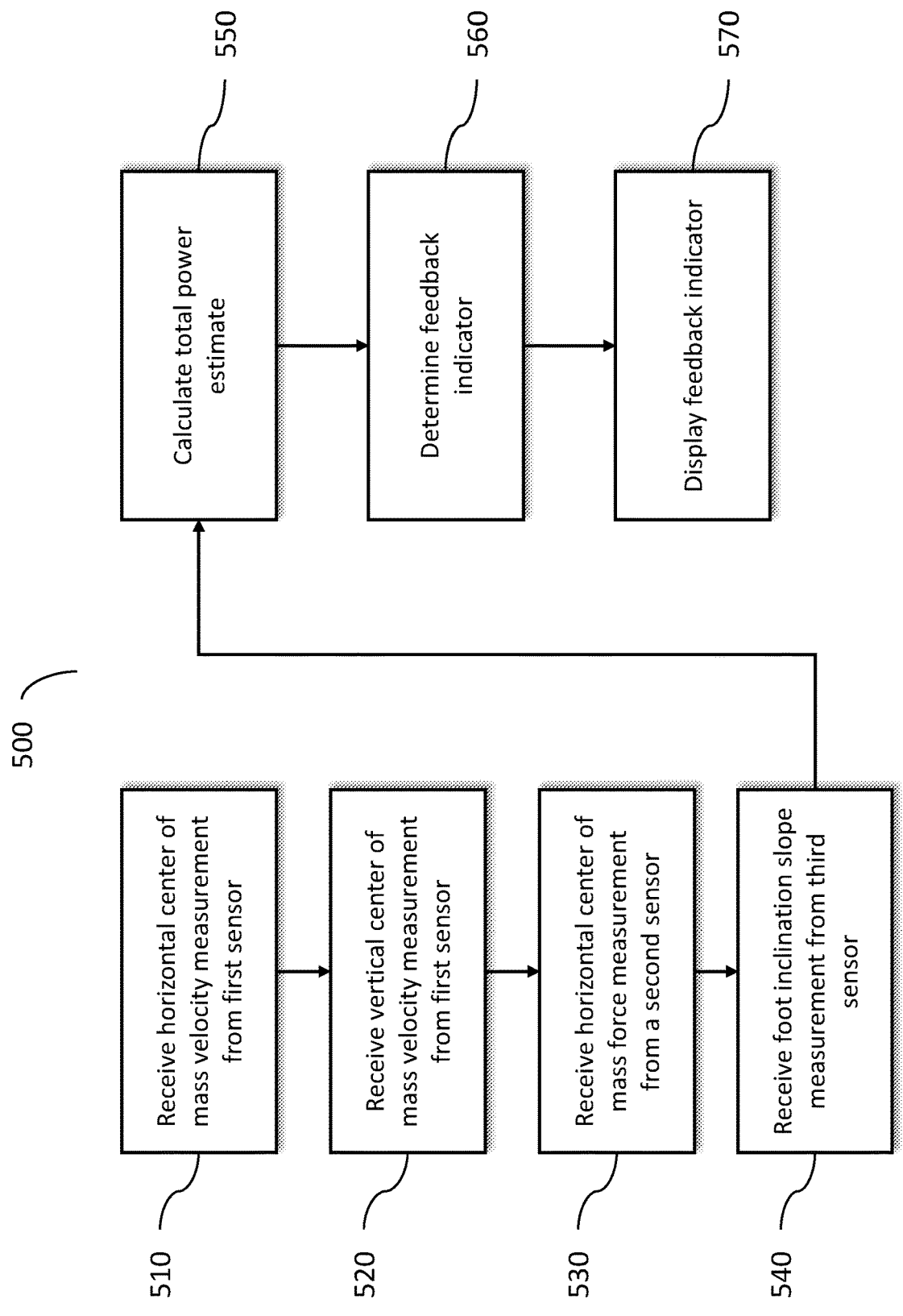
FIG. 5 illustrates a flowchart of a non-limiting, exemplary method for estimating and displaying feedback for power output for running in accordance with preferred embodiments.

FIG. 5 illustrates a preferred method for estimating total power according to preferred embodiments. At step 510, a horizontal velocity of the center of mass is received from a first sensor or sensor assembly. The first sensor or sensor assembly is ideally placed at or near the center of mass of the runner. At step 520, a vertical velocity of the center of mass is received from the first sensor or sensor assembly. In some embodiments, a different sensor or sensor assembly than the first sensor or sensor assembly can measure the horizontal velocity. Again, this sensor or sensor assembly is ideally placed at or near the center of mass of the runner. At step 530, a measurement of horizontal force of the center of mass is received from a second sensor or sensor assembly. In some embodiments, the same sensor assembly that measures velocity of the center of mass can include a sensor to measure the horizontal acceleration of the center of mass from which a horizontal force vector can be derived. At step 540, a measurement of the inclination slope of the foot is received from a third sensor or sensor assembly. At step 550, the total power ($P_{ToT}$) is estimated from the kinetics relations of the horizontal force ($F_H$), horizontal ($v_H$) and vertical velocity ($v_v$) acting on center of mass as well as the slope angle of ground ($\alpha$):

$$P_{ToT} = F_H v_H M g v_v \sin \alpha \qquad \text{Eq. (2)}$$

Force and velocity can be estimated from body acceleration measured with a sensor placed on waist (close to CoM):

$$F_H = M A_H \qquad \text{Eq. (3)}$$

$$v_H = v_0 + \int A_H dt \qquad \text{Eq. (4)}$$

and $$v_V = v'_0 + \int A_V dt \qquad \text{Eq. (5)}$$

and the slope can be estimated from the foot inclination during stance phase using shoe accelerometer or barometric pressure sensor. Force can be estimated at the sensor assembly measuring acceleration or at another sensor assembly or computing device.

Total power estimations are computed at predetermined intervals. In some embodiments, total power estimations can be calculated when some triggering event occurs such as when a velocity, acceleration, or force changes or reaches a threshold. According to preferred embodiments, total power estimates can be calculated and changes in total power can be determined. At step 560, a feedback indicator is determined. At step 570, a feedback indicator is displayed to the runner. Such a feedback indicator can be based on the total power estimate or a change in the rate of the total power estimate to indicate to the runner increasing or decreasing power output during a session. Additionally, according to preferred embodiments a total power estimate that exceeds or falls below a predetermined threshold can trigger a feedback indicator. In some embodiments, a feedback indicator can take the form or a display element on a smartwatch, smartphone, smart glasses, and the like. In other embodiments, a feedback indicator can be audial or pressure indicators.

According to some preferred embodiments, an initialization step is included to calibrate the sensors and test their alignment according to the anatomical frame of the runner. Calibration of the sensors can be performed at each use and alignment initialization can be performed once to determine the best or a sufficient location of a sensor or at each use.

Figure 6:
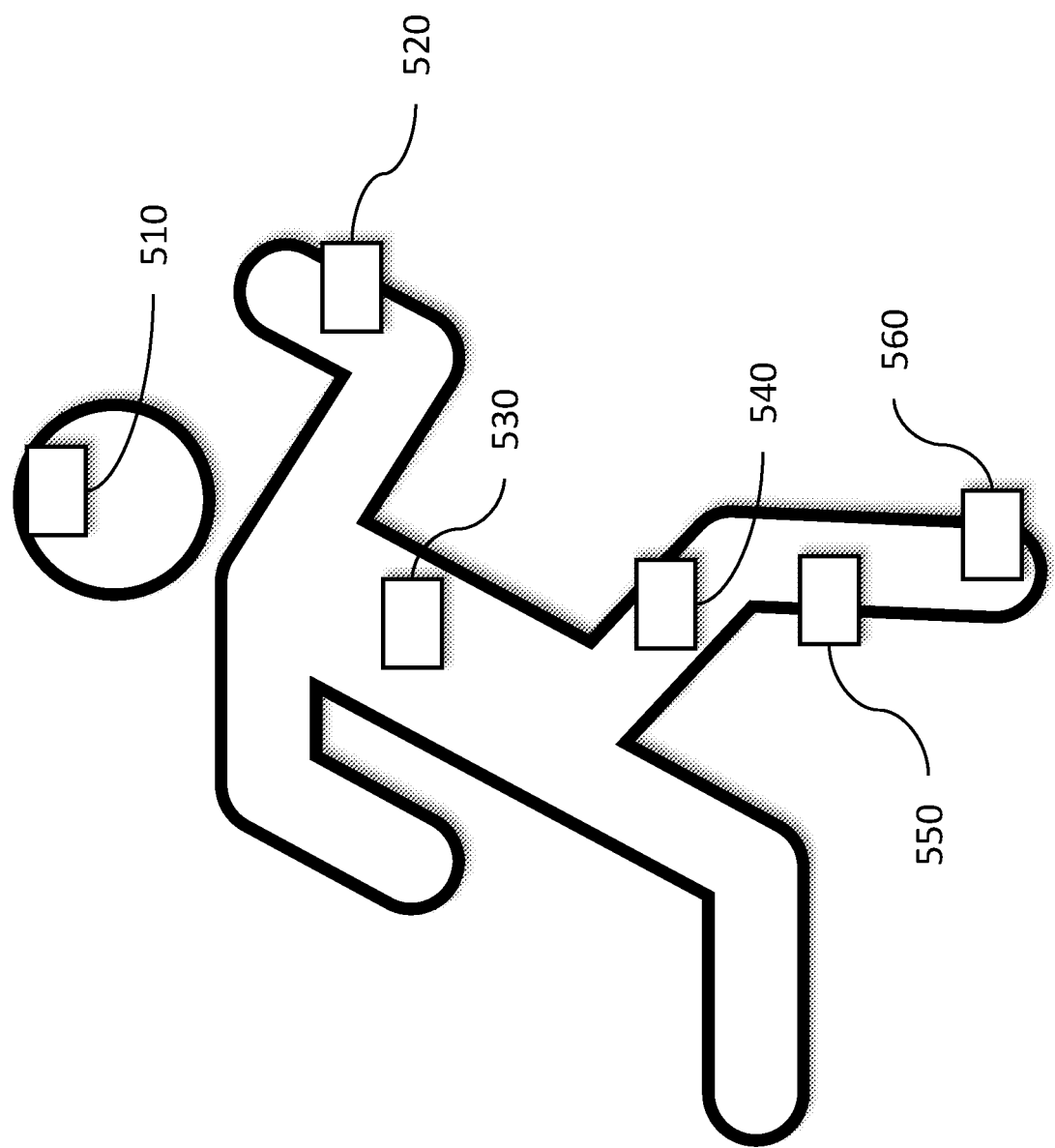
FIG. 6 illustrates a schematic of a non-limiting, exemplary configuration of sensors on the body of a runner in accordance with preferred embodiments.

FIG. 6 illustrates an arrangement of sensor assemblies, sensors, or a combination thereof on a runner for the measurement of total power. A plurality of sensors 610-650, preferably IMUs, are attached to a runner's body. In the embodiment shown, sensors 610-650 are placed at the head, trunk, thigh, shank, foot, and wrist to estimate the total power at each of those body segments. According to preferred embodiments, a plurality of sensors or sensor assemblies are placed at different segments of the body and sufficiently spaced apart to obtain distinct measurements. Sensors or sensor assemblies measure inertia and angular velocity of the respective body segment. The embodiment shown also includes a sensor or sensor assembly 660 similar to sensor or sensor assembly 415.

Figure 7:
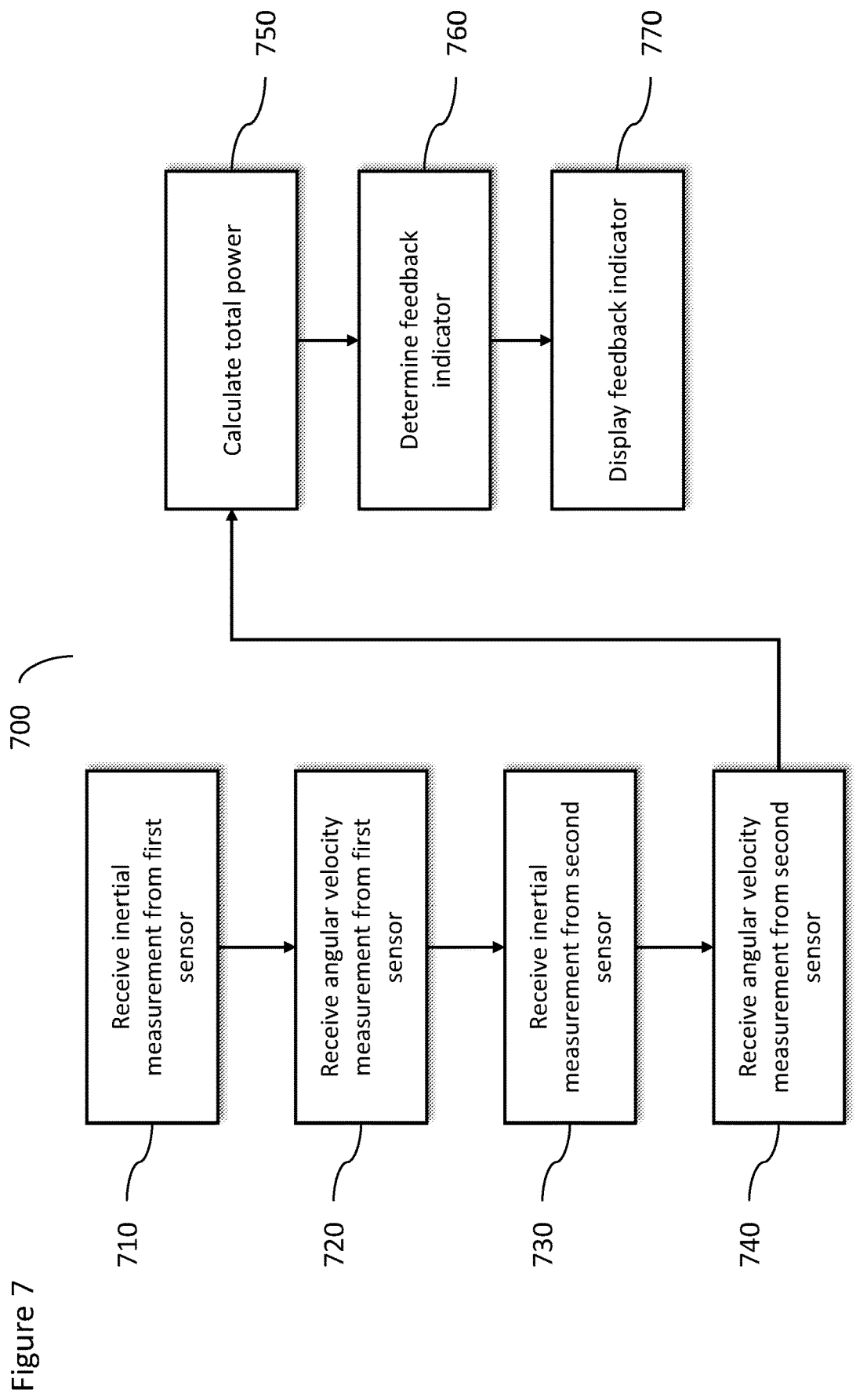
FIG. 7 illustrates a flowchart of a non-limiting, exemplary method for estimating and displaying feedback for power output for running in accordance with preferred embodiments.

FIG. 7 illustrates an exemplary method 700 in accordance with embodiments for estimating total power from inertia and angular velocity from embodiments consistent with FIG. 6. At step 710, an inertial measurement from a first sensor is received. At step 720, an angular velocity from the first sensor is received. At step 730, an inertial measurement from a second sensor is received. At step 740, an angular velocity from the second sensor is received. According to some embodiments, additional inertial and angular velocity measurements from additional sensors are received. In preferred embodiments, the measurements are synchronized so that an inertia and angular velocity are measured at substantially the same time and the measurements from the different sensors are taken substantially at the same time. At step 750, the total power estimate is calculated. Here we consider the mechanical power of individual segment of inertia $I_j$ to estimate the whole power from the angular velocity ($w_j$).

$$P_{ToT} = \Sigma I_j w_j \qquad \text{Eq. (6)}$$

At step 760, a feedback indicator is determined. At step 770, the feedback indicator is presented to the runner or some other user.

In some embodiments, estimating power output can use machine learning in accordance with preferred embodiments. Here we consider also several body segments but instead of using the above equation we will use machine learning techniques to estimate $P_{ToT}$. Embodiments can use reference data (from a force plate, for example) for a learning phase. Here, a sensor is located on the foot, the sensor including a force plate that measures the forces on the foot as it strikes and releases from the fly through the stance gait phases.

Preferred embodiments, including embodiments described herein, can be used to detect, measure, and report a user's training or activity progress, fatigue, or injury risks. Embodiments can be used to provide real-time feedback on performance and economy (i.e., feedback during an activity). Embodiments can also be used to measure and follow speed and pace changes of racers. Such embodiments can be useful during broadcasts of races. Embodiments of the present invention can obtain data at a greater granularity than current devices, including:

Data at each stride (~11'000)
Various parameters (VO2, kinematics)
Real-time data
3 ms Accuracy Embodiments can be used to understand runner profiles for better experience of purchasing equipment, shoes in particular, and generate more brand loyalty.

Machine learning could overcome some drawbacks of a biomechanical model where many segments are necessary to estimate accurately the $P_{ToT}$. Here we exploit some correlation/association between segments to minimize the number of segments and consequently the number of sensors. In embodiments implementing a machine learning technique, one of the sensors or another wearable device is a self-learning power meter equipped with a microprocessor and an embedded machine learning library. The machine learning library can be implemented according to different AI techniques known in the art. For example, some non-limiting suitable techniques include LSTM networks; various types of RNN (recurrent neural network) such as a Siamese RNN; a CNN (convoluted neural network); and an MNN (modular neural network).

In preferred embodiments, the machine learning library would be incorporated in a wearable device.

Any and all references to publications or other documents, including but not limited to, patents, patent applications, articles, webpages, books, etc., presented in the present application, are herein incorporated by reference in their entirety.

Example embodiments of the devices, systems and methods have been described herein. As noted elsewhere, these embodiments have been described for illustrative purposes only and are not limiting. Other embodiments are possible and are covered by the disclosure, which will be apparent from the teachings contained herein. Thus, the breadth and scope of the disclosure should not be limited by any of the above-described embodiments but should be defined only in accordance with claims supported by the present disclosure and their equivalents. Moreover, embodiments of the subject disclosure may include methods, systems and apparatuses which may further include any and all elements from any other disclosed methods, systems, and apparatuses, including any and all elements corresponding to target particle separation, focusing/concentration. In other words, elements from one or another disclosed embodiment may be interchangeable with elements from other disclosed embodiments. In addition, one or more features/elements of disclosed embodiments may be removed and still result in patentable subject matter (and thus, resulting in yet more embodiments of the subject disclosure). Correspondingly, some embodiments of the present disclosure may be patentably distinct from one and/or another reference by specifically lacking one or more elements/features. In other words, claims to certain embodiments may contain negative limitation to specifically exclude one or more elements/features resulting in embodiments which are patentably distinct from the prior art which include such features/elements.

What is claimed is:

1. A method for measuring the power output of a runner, comprising:
   sampling, during a contact phase of a foot of the user during an activity of the user, data from a first sensor configured to measure data indicating the inclination of the foot;
   sampling, data from a second sensor configured to measure data indicating a change in elevation;
   buffering the data from the first and second sensors for a predetermined number of sampling cycles;
   calculating, during the activity of the user, a slope trajectory from the buffered data; and
   estimating a power based in part on the slope trajectory.

2. The method of claim 1, wherein the first sensor comprises a first accelerometer mounted at the foot of the user such that the first accelerometer measures a vertical acceleration when the foot is inclined that is lesser than the vertical acceleration when the foot is not inclined.

3. The method of claim 2, wherein the slope trajectory is calculated at least in part from a vertical acceleration sampled from the first accelerometer.

4. The method of claim 2, wherein the first sensor is integrated as part of a shoe.

5. The method of claim 1, wherein the second sensor comprises a second accelerometer and the slope trajectory is calculated at least in part from vertical velocity data sampled from the second accelerometer and vertical acceleration data sampled from the first accelerometer.

6. The method of claim 1, wherein the second sensor comprises a barometer, and the slope trajectory is calculated at least in part from barometric pressure sampled from the barometer and vertical acceleration data sampled from the first accelerometer.

7. The method of claim 6, further comprising sampling, from a third sensor comprising a second accelerometer, vertical velocity data and the slope trajectory is calculated at least in part from the vertical velocity sampled from the second accelerometer and vertical acceleration data sampled from the first accelerometer.

8. The method of claim 2, wherein a slope trajectory greater than 0 degrees is calculated where each vertical acceleration sampled from the first accelerometer over a predetermined number of gait cycles indicates the foot is not inclined.

9. The method of claim 2, wherein a slope trajectory less than a predetermined slope trajectory threshold is calculated where one or more vertical accelerations sampled from the first accelerometer over a predetermined number of gait cycles indicates the foot is inclined more than the predetermined slope trajectory threshold.

10. The method of claim 9, wherein the predetermined slope trajectory threshold is 2 degrees.

11. A system for measuring the power output of a runner, comprising:
    a first sensor configured to measure data indicating the inclination of the foot;
    a second sensor configured to measure data indicating a change in elevation; and
    a computing device having a processor and a memory for storing buffered data from the first and second sensors for a predetermined number of sampling cycles and having stored thereon instructions for execution by a processor to cause the computational device to receive data sampled from the first sensor and from the second sensor, to buffer the data from the first and second sensors for a predetermined number of sampling cycles, to calculate, during an activity of the user, a slope trajectory from the buffered data, and to estimate a power based in part on the slope trajectory.

12. The system of claim 11, wherein the first sensor comprises a first accelerometer mounted at the foot of the user such that the first accelerometer measures a vertical acceleration when the foot is inclined that is lesser than the vertical acceleration when the foot is not inclined.

13. The system of claim 12, wherein the instructions are further configured to cause the computational device to calculate the slope trajectory at least in part from a vertical acceleration sampled from the first accelerometer.

14. The system of claim 12, wherein the first sensor is integrated as part of a shoe.

15. The system of claim 11, wherein the second sensor comprises a second accelerometer and the instructions are further configured to cause the computational device to calculate the slope trajectory at least in part from vertical velocity data sampled from the second accelerometer and vertical acceleration data sampled from the first accelerometer.

16. The system of claim 11, wherein the second sensor comprises a barometer, and the instructions are configured to cause the computational device to calculate the slope trajectory at least in part from barometric pressure sampled from the barometer and vertical acceleration data sampled from the first accelerometer.

17. The system of claim 16, comprising a second accelerometer and wherein the instructions are further configured to cause the computational device to sample, from the second accelerometer, vertical velocity data and to calculate the slope trajectory at least in part from the vertical velocity sampled from the second accelerometer and vertical acceleration data sampled from the first accelerometer.

18. The system of claim 12, wherein the instructions are further configured to cause the computational device to calculate a slope trajectory greater than 0 degrees where each vertical acceleration sampled from the first accelerometer over a predetermined number of gait cycles indicates the foot is not inclined.

19. The system of claim 12, wherein the instructions are further configured to cause the computational device to calculate a slope trajectory less than a predetermined slope trajectory threshold where one or more vertical accelerations sampled from the first accelerometer over a predetermined number of gait cycles indicates the foot is inclined more than the predetermined slope trajectory threshold.

20. The system of claim 19, wherein the predetermined slope trajectory threshold is 2 degrees.

* * * * *